UNITED STATES PATENT OFFICE.

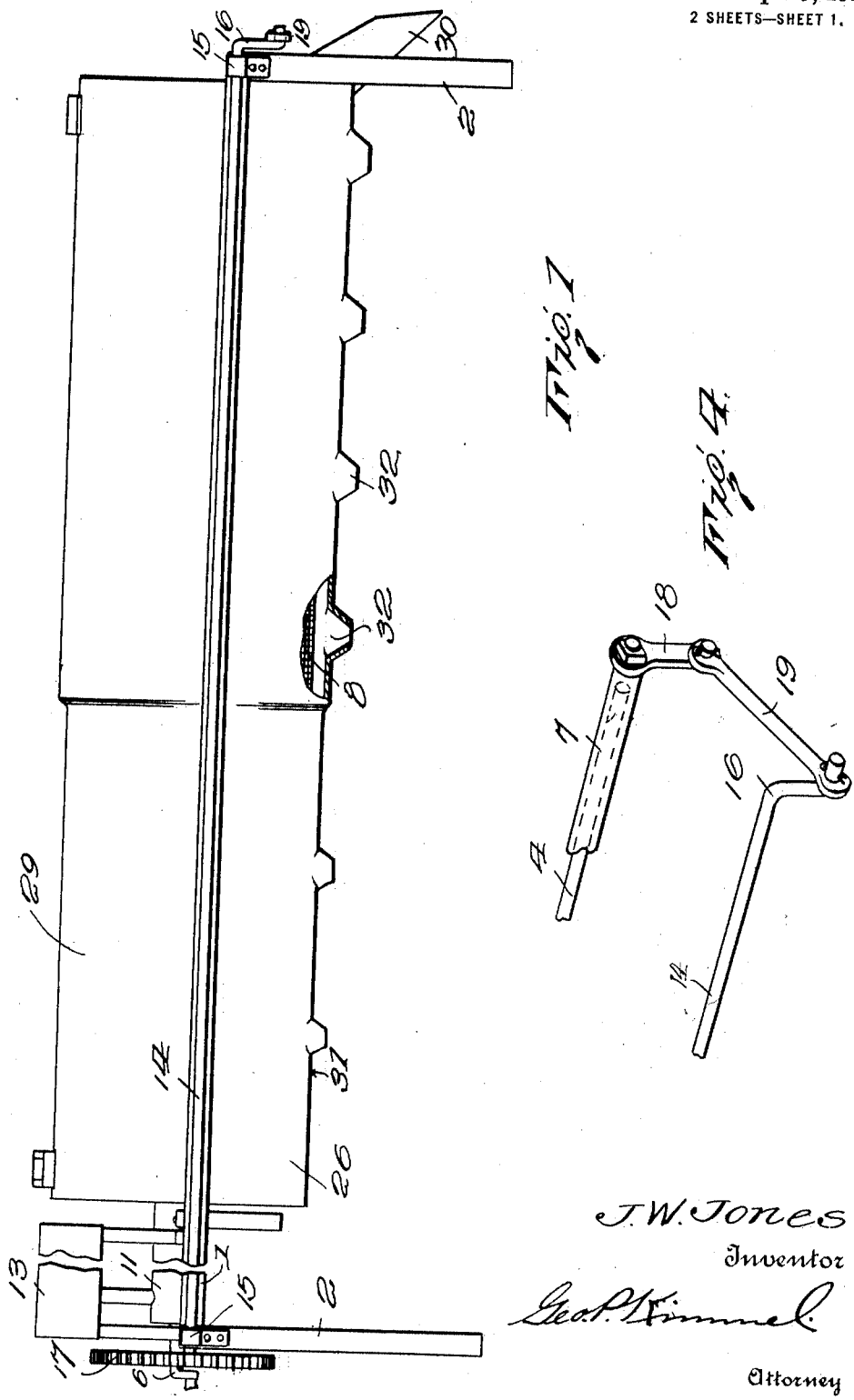

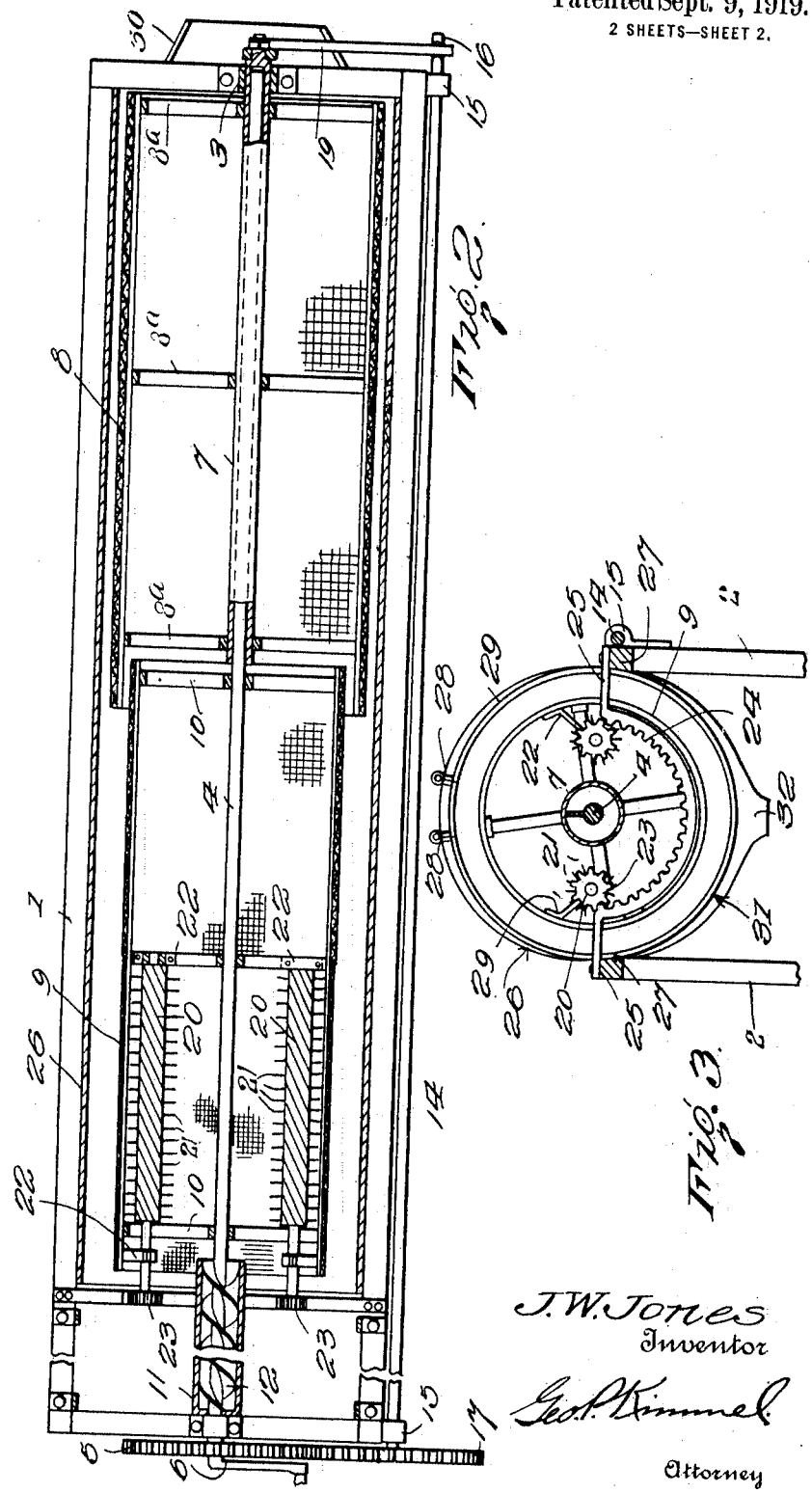

JOEL W. JONES, OF GARRETT, TEXAS.

COTTON-SEED-SEPARATING MACHINE.

1,315,775.   Specification of Letters Patent.   Patented Sept. 9, 1919.

Application filed February 25, 1918. Serial No. 219,034.

*To all whom it may concern:*

Be it known that I, JOEL W. JONES, a citizen of the United States, residing at Garrett, in the county of Ellis and State of Texas, have invented certain new and useful Improvements in Cotton-Seed-Separating Machines, of which the following is a specification.

My invention relates to improvements in assorting machines and it is the principal object of the invention to provide a machine for separating cotton seeds from the bolls and other foreign matter adhering thereto and grading the same according to the relative size thereof; the bolls and the foreign matter being discharged from the machine into a suitable waste container while the graded or assorted seeds are discharged into a suitable container therefor.

The invention also aims to provide novel means for imparting a rotary and an oscillatory motion to the separating elements of the machine whereby the seeds will be thoroughly agitated and as a consequence, the separating or assorting of the same materially expedited.

It is also an object of the invention to provide rotatable separating brushes adapted for arrangement in one of the separting elements and serving as means for engaging and separating the seeds from the bolls or foreign matter and cleaning the same.

Other objects will be in part obvious and in part pointed out hereinafter.

In order that the invention and the manner of its application may be readily understood by those skilled in the art, I have in the accompanying illustrated drawings and in the detailed following description based thereon, set forth a preferred embodiment of the invention:

In these drawings:

Figure 1 is a side elevation of the machine having parts broken away and shown in section, Fig. 2 is a longitudinal section therethrough, Fig. 3 is an end elevation of the same, and Fig. 4 is a fragmental detail perspective of the connection between the several drum driving shafts.

Having more particular reference to the drawings, in connection with which like reference characters will designate corresponding parts throughout the several views, 1 represents the substantially rectangular shaped frame of the machine, the same of course being provided with a plurality of supporting legs generally indicated by the numeral 2. Extending longitudinally of the frame 1 and journaled in bearings 3 arranged upon the opposite ends of said frame is a shaft 4 having a gear 5 mounted upon one end thereof and a crank handle 6 attached to the same. Loosely mounted upon the rear portion of the longitudinally disposed shaft 4 is a hollow shaft 7 having bearing arms or spiders 8ª fixedly arranged thereon and serving as means for supporting a foraminated drum 8, the opposite ends of which, as will be noted, are open. It is to be also noted that the foraminated drum 8 is formed of mesh differing in gage, that is, the forward portion of the drum is formed of a ⅜ inch gage mesh while the rear portion of the same is formed of a ½ inch gage mesh, the purpose of which will be hereinafter more fully described.

Arranged adjacent the forward or inner end of the drum 8 is a smaller drum 9, which as will be noted, is of less diameter and is formed of a wire mesh or other foraminated material differing in gage, that is, the forward portion of the mesh is preferably of ⅛ inch gage while the rear portion of the same is preferably formed of ¼ inch gage mesh. To establish communication between the foraminated drums 8 and 9, the adjacent ends of the same are telescopically engaged as clearly shown in the Fig. 2 and as a consequence, the seeds or other material arranged in and being separated by the machine will be afforded a continuous passage through the separating drums thereof. Bearing arms 10 or spiders are arranged on the forward portion of the longitudinally disposed shaft 4 and as will be understood, serve as means for supporting the drum 9 thereon.

Supported upon the end of the frame 1 adjacent the outer open end of the drum 9 is a seed conveying trough 11, which trough as will be noted, is arranged about a portion of the shaft 4 and is provided with a spiral conveyer 12, which conveyer is attached to the adjacent portion of said shaft 4 by a suitable means. Positioned above the trough 11 is a hopper 13 into which the matter to be separated by the machine is placed. Suitable means may be arranged on the hopper for regulating the discharge of the matter therefrom into the trough 11, said means being conventional in the art.

In order that an oscillatory motion may be transmitted to the larger drum 8, which as hereinbefore stated, is carried upon the shaft 7 loosely mounted on the rear portion of the shaft 4, I arrange a second longitudinally disposed shaft 14 in bearings 15 secured to one side of the machine frame; forming a crank 16 upon the outer end of the shaft and mounting a gear 17 upon the inner end of the same, which gear normally meshes with the gear 5 arranged on the shaft 4. To effect connection between the drum and the crank portion 16, there is secured to the outer end of the shaft 7 a crank 18 which is engaged by a pitman or other suitable connecting element 19, which element in turn, is similarly connected to the crank portion 16. Hence, upon rotation of the shaft 14, an oscillatory motion will be imparted to the larger drum 8 due to its connection with the crank portion 16.

Rotatable separating and cleaning brushes 20 having a plurality of spurs or fingers 21 arranged about their peripheral surfaces are supported in bearings 22 secured to the inner side of the smaller drum 9 at substantially diametrially opposite points. Spur gears 23 are carried upon certain of the ends of these rollers and are adapted to be alternately engaged with a segmental rack 24 having brackets 25 arranged upon its opposite ends and fixedly connected to the opposite sides of the frame 1. Obviously, the segmental rack 24 is positioned at a point adjacent the outer end of the drum 9 and as a consequence, the spur gears 23 carried by the rollers 21 project slightly beyond the outer end of said drum in order that they may be effectually engaged with the segmental rack.

A housing 26 is arranged about the drums 8 and 9 and is supported upon the sides of the frame 1 as indicated by the numeral 27. To permit access to the foraminated drums, the upper side portions of the housing, which is cylindrical, are hingedly engaged with the same as at 28, thereby affording movable covers designated by the numeral 29, which, when it is desired, may be readily swung upwardly thereby exposing the foraminated drums. The rear end of the housing is partially open and has a discharge chute 30 supported therein, the inner end of which projects to a point in proximity to the open adjacent end of the drum 8; hence, affording means for receiving the waste matter separated from the cotton seeds and directing the same into a suitable container therefor arranged adjacent the machine. The bottom of the housing 26 is inclined as indicated by the numeral 31 and is formed with a series of discharge chutes 32, into which the different grades of assorted seeds dropping from the foraminated drums 8 and 9 will be directed. Of course, receptacles are arranged beneath the chutes 32 for receiving the assorted or graded cotton seeds.

In operation, the foraminated drum is rotated by the longitudinally disposed shaft 4. The matter containing the cotton seeds is discharged into the forward end of the drum 9 from the conveying trough 11 and due to the rotary motion of the drum 9, the matter will be thoroughly agitated and a portion of the seeds separated from the bolls or other foreign matter. Should the seeds cling to the bolls, the rotatable brushes 20, which are alternately rotated due to their engagement with the segmental rack 24 will engage with the same and serve as a positive means for separating them. That portion of the seeds thus separated will of course fall onto drum 9 and through the different gages of mesh onto the inclined bottom 31 of the casing 26, from whence they will be directed into engagement with the discharge chutes 32. Of course, those seeds which are of a size greater than the gage of the mesh forming the drum 9 will be moved along the drum into the larger drum 8 and when engaged with the proper mesh therein will drop through the same onto the inclined bottom 27 and then be discharged by way of the chutes 32 into the receiving receptacles. Due to the connection of the drum 8 with the longitudinally disposed shaft 14, it of course will be understood that the same will be oscillated as said shaft is rotated by reason of its connection with the gear 5 carried on the shaft 4. Thus, the matter remaining after the first step in the separation of the seeds will be thoroughly agitated in the drum 9 and the seeds separated therefrom, will as before stated, drop onto the inclined bottom 31 of the housing while the waste consisting of the bolls and foreign matter will be carried to the rear end of the drum 8 and discharged onto the chute 30 then into the receiving receptacle therefor. Obviously, by providing the screw conveyer 12, the matter to be separated by the machine will be fed into the same in an even and uniform manner and as a consequence, clogging of different parts of the same will be positively prevented.

It is to be understood that my improved machine may be used for separating various kinds of seeds and different grains, should it be desired; the operation of this machine being identical with that hereinbefore set forth and serving to effect the assorting of the seeds or grains in a rapid and practical manner.

Manifestly, the construction shown is capable of considerable modification and such modification as is within the scope of my claims, I consider within the spirit of my invention.

I claim:

1. In a separating machine, a frame, foraminated drums mounted on said frame, means for imparting rotary motion to one drum, means for imparting oscillatory motion to the other drum, rotatable brushes arranged in one of the drums, and feeding means communicating with one of said drums.

2. In a separating machine, a frame, foraminated drums mounted on said frame, means for imparting rotary motion to one of said drums, means for imparting oscillatory motion to the other drum, rotatable brushes arranged in one of the drums, means mounted on the frame adapted to be alternately engaged by the brushes for rotating the same, and feeding means communicating with one of the drums.

3. In a separating machine, a frame, foraminated drums mounted on said frame, means for imparting rotary motion to one of said drums, means for imparting oscillatory motion to the other drum, rotatable brushes arranged in one of the drums adapted to be intermittently rotated, a housing arranged about the drum having an inclined bottom and a plurality of openings formed therein, and feeding means communicating with one of said drums.

4. In a separating machine, a frame, foraminated drums mounted on said frame, means for imparting rotary motion to one of said drums, other means connected to the first means for imparting oscillatory motion to the remaining drum, a segmental rack mounted on the frame, brushes rotatably mounted in one of said drums and adapted to be alternately engaged with said rack for causing rotation thereof, a housing arranged about the drums having an inclined bottom and a plurality of openings formed in the same, and feeding means extending into engagement with one of the drums.

5. In a separating machine, a frame, a shaft extending longitudinally of the frame, a foraminated drum mounted on said shaft, a hollow shaft loosely mounted on the first shaft, a second foraminated drum mounted on said hollow shaft and adjoining said first drum, a second longitudinally disposed shaft mounted on the frame having a crank formed in one end of the same, a crank arranged on the adjacent end of said hollow shaft and connected to the crank on the second mentioned shaft, and means for transmitting rotary motion from the first shaft to the second shaft.

In testimony whereof, I affix my signature hereto.

JOEL W. JONES.

Copies of this patent may be obtained for five cents each, by addressing the "Commissioner of Patents, Washington, D. C."